United States Patent [19]
Heidemann

[11] Patent Number: 5,333,089
[45] Date of Patent: Jul. 26, 1994

[54] OPTICAL COMMUNICATIONS SYSTEM EMPLOYING FIBER-OPTIC AMPLIFIERS AND CONTROL OF THE TRANSMITTER WAVELENGTH

[75] Inventor: Rolf Heidemann, Tamm, Fed. Rep. of Germany

[73] Assignee: ALCATEL N.V., Amsterdam, Netherlands

[21] Appl. No.: 20,084

[22] Filed: Feb. 19, 1993

[30] Foreign Application Priority Data

Mar. 19, 1992 [DE] Fed. Rep. of Germany ....... 4208857

[51] Int. Cl.[5] ............................................. H01S 3/103
[52] U.S. Cl. ..................................... 359/341; 359/160
[58] Field of Search ............... 359/154, 160, 179, 187, 359/188, 341

[56] References Cited

U.S. PATENT DOCUMENTS

| | | | |
|---|---|---|---|
| 4,307,469 | 12/1981 | Casper et al. | 455/613 |
| 5,077,816 | 12/1991 | Glomb et al. | 359/124 |
| 5,088,095 | 2/1992 | Zirngibl | 372/6 |
| 5,128,800 | 7/1992 | Zirngibl | 359/341 |
| 5,214,524 | 5/1993 | Shigematsu et al. | 359/124 |

FOREIGN PATENT DOCUMENTS

| | | |
|---|---|---|
| 3214614 | 4/1982 | Fed. Rep. of Germany . |
| 63-055991 | 3/1988 | Japan . |
| 1039787 | 2/1989 | Japan . |

OTHER PUBLICATIONS

Zirngibl, "All-Optical Remote Gain Switching in Er-- Doped Fibre Amplifiers," Electronic Letters, vol. 27, No. 13, Jun. 20, 1991, pp. 1164–1166.

Giles, C. R., "Propagation of Signal and Noise in Concatenated Erbium-Doped Fiber Optical Amplifiers," Journal of Lightwave Technology, vol. 9, No. 2, Feb. 1991, pp. 147–154.

Giles, C. R., "Modeling Erbium-Doped Fiber Amplifiers", Journal of Lightwave Technology, vol. 9, No. 2, Feb. 1991, pp. 271–283.

*Primary Examiner*—Mark Hellner
*Attorney, Agent, or Firm*—Spencer, Frank & Schneider

[57] ABSTRACT

An optical communications system includes an optical transmitter equipped with a semiconductor laser for generating a light signal and a light waveguide path for transmitting the generated light signal to an optical receiver in whose light waveguide path at least one fiber-optic amplifier is included. The fiber-optic amplifier is equipped with an amplifying light waveguide piece. The optical transmitter includes a control device having a reference waveguide piece, which regulates an emission wavelength of the semiconductor laser in dependence on absorption of the light signal in the reference light waveguide piece. The reference waveguide piece has a maximum in absorption at a wavelength at which the amplifying light waveguide piece of the at least one fiber-optic amplifier has a maximum in emission.

10 Claims, 1 Drawing Sheet

OPTICAL COMMUNICATIONS SYSTEM EMPLOYING FIBER-OPTIC AMPLIFIERS AND CONTROL OF THE TRANSMITTER WAVELENGTH

CROSS REFERENCE TO RELATED APPLICATION

This application claims the priority of application Ser. No. P 42 08 857.7, filed Mar. 19th, 1992, in the Federal Republic of Germany, the subject matter of which is incorporated herein by reference.

BACKGROUND OF THE INVENTION

The invention relates to an optical communications system known from: C. R. Giles, "Propagation of Signal and Noise in Concatenated Erbium-Doped Fiber Optical Amplifiers", Journal of Lightwave Technology, Vol. 9, No. 2, Feb., 1991, pages 147-154, particularly FIG. 2.

C. R. Giles, "Modeling Erbium-Doped Fiber Amplifiers", Journal of Lightwave Technology, Vol. 9, No. 2, Feb., 1991, pages 271-283, particularly FIG. 2 at page 272, discloses that the gain of a fiber-optic amplifier is a function of the wavelength of its optical input signal, that is, the emission wavelength of the optical transmitter of the transmission system. The wavelength dependence of the gain (dashed curve) is shown in two examples for different compositions of $Er^{3+}$ doped pieces of light waveguides which are employed with preference in fiber-optic amplifiers. In addition, the wavelength dependence of the absorption in the same light waveguide pieces is shown (solidly drawn curve). It can be seen that the gain curve and the absorption curve have their maximum at the same wavelength and that this wavelength is almost the same for the various types of light waveguide pieces.

In optical communications systems employing such fiber-optic amplifiers, the described wavelength dependence of the gain brings about the following problem: if the emission wavelength of the semiconductor laser employed in the optical transmitter does not lie at the wavelength at which the fiber-optic amplifier has its maximum gain, but only slightly next to it, the gain is considerably poorer. Moreover, if several fiber-optic amplifiers are arranged in series, noise at the wavelength of maximum gain may accumulate and thus worsen the signal to noise ratio.

Added to this is also the following problem: is a so-called "laser chirp" is known in Optical transmission systems, that is, an undesirable fluctuation in the wavelength of the optical signal that is a function of signal amplitude of an electrical signal to be transmitted optically. If the wavelength of the transmitted optical signal is not the wavelength that is optimum with respect to gain in fiber-optic amplifiers, the degree (steepness) with which the gain curve depends on the wavelength is very great and the undesirable wavelength fluctuations present in the optical signal are converted by the optical gain into considerable, undesirable amplitude fluctuations. In the region of the maximum of the gain curve such amplitude fluctuations caused by wavelength fluctuations are noticeably less.

Consequently it would be desirable for the emission wavelength of the optical transmitter of the transmission system to be equal to that wavelength at which the particular type of fiber-optic amplifier, of which one or several are included in the light waveguide path, has its maximum gain. If one considers a chain of fiber-optic amplifiers connected in series in a transmission path, each having the described wavelength dependence of its gain, it is clear that the fiber-optic amplifiers arranged in the chain as a whole produce a good amplification of the transmitted optical signals only in a narrow band of wavelengths. Although semiconductor lasers are available on the market whose emission wavelengths lie at the optimum wavelength (e.g., 1536 nm or 1555 nm) with respect to the fiber-optic amplifiers, there are deviations due to fluctuations between different individual units of a certain type of laser and due to changes in the emission wavelength as a result of aging of the semiconductor lasers, as well as due to fluctuations in respective ambient temperatures.

The cited publications do not describe how it can be accomplished that the emission wavelength of the optical transmitter of the system is adapted to the wavelength at which the light waveguide path including one or several fiber-optic amplifiers produces an effective gain.

SUMMARY OF THE INVENTION

It is the object of the invention to disclose a system of this type in which such adaptation is provided.

This is accomplished in an optical communications system including an optical transmitter equipped with a semiconductor laser for generating a light signal and further including a light waveguide path for transmitting the generated light signal to an optical receiver in whose light waveguide path at least one fiber-optic amplifier is included which is equipped with an amplifying light waveguide piece in that the optical transmitter includes a control device which regulates the emission wavelength of the semiconductor laser in dependence on the absorption of the light signal in a reference light waveguide piece which has a maximum in the absorption spectrum at that wavelength at which the amplifying light waveguide piece of each one of the fiber-optic amplifiers has a maximum in the emission spectrum.

The optical transmitter of an optical communications system employing at least one fiber-optic amplifier includes a control device which regulates the emission wavelength of the semiconductor laser as a function of the absorption of the light signal in a reference light waveguide piece which has a maximum in its absorption spectrum at that wavelength at which the amplifying light waveguide piece of each one of the fiber-optic amplifiers has a maximum in its emission spectrum.

The invention is intended to accomplish that the emission wavelength of the optical transmitter is tuned to that wavelength at which the fiber-optic amplifiers maximally amplify their input light. In this connection, an advantage is derived from the fact that the amplification spectrum, that is, the wavelength dependent characteristic of the gain, of a fiber-optic amplifier has its maximum at the same wavelength as the absorption spectrum of the light waveguide piece employed in the fiber-optic amplifier as the amplifying light waveguide piece.

BRIEF DESCRIPTION OF THE DRAWINGS

The invention will now be described in greater detail with reference to one embodiment thereof that is illustrated in the drawing figures, in which.

DETAILED DESCRIPTION OF THE PREFERRED EMBODIMENT

Figure 1:
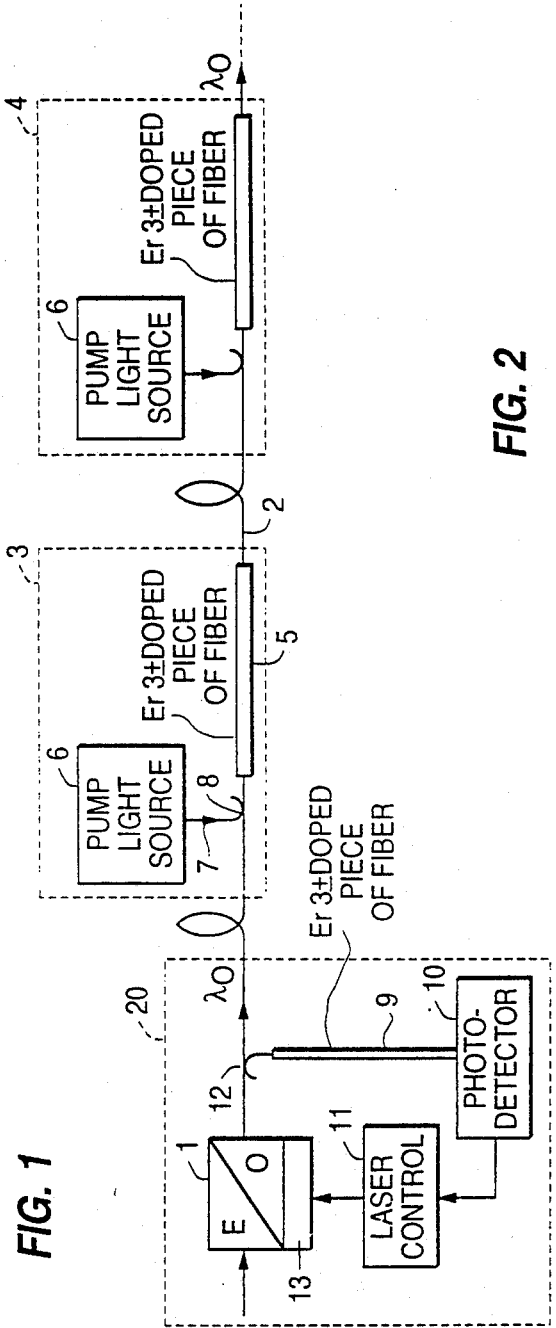
FIG. 1 is a block circuit diagram of the transmission system according to the invention.

The transmission system according to the invention includes, as do prior art transmission systems, as its typical components a semiconductor laser 1, also called an electro-optical transducer E/O, which converts its electrical input signal into an optical output signal of a certain emission wavelength $\lambda_O$, a light waveguide transmission path 2 which connects semiconductor laser 1 with a far distant, non-illustrated optical receiver, and fiber-optic amplifiers 3 and 4 that are included in the light waveguide path 2.

The number of fiber-optic amplifiers included in light waveguide path 2 is of no significance for the present invention. The number depends on the particular application for which the optical transmission path is to be used. Such applications also include those in which the transmitted optical signals at the output of the fiber-optic amplifiers are branched onto a plurality of continuing light waveguides which again may include fiber-optic amplifiers. Significant for the present invention is only that the transmission path includes at least one fiber-optic amplifier.

For the case where several fiber-optic amplifiers are provided, only the amplifier given the reference numeral 3 will hereinafter be considered. It includes, as is typical for such amplifiers, a light waveguide piece 5 which amplifies light signals, for example an $Er^{3+}$ doped piece of light waveguide, and a pump light source 6 which couples its pump light through a light waveguide piece 7 and a fiber-optic coupler 8 into the light amplifying light waveguide piece 5.

For the sake of simplicity, the term light is employed hereinafter for any optical radiation, that is, also for radiation outside of the visible range. Typically intensity modulated light at a wavelength around 1550 nm is transmitted in such systems.

Insofar as described above, this is a prior art system which has the above-described problems.

To solve these problems, the invention provides the following: an $Er^{3+}$ doped light waveguide piece 9 into which is coupled part of the light emitted by laser 1, a photodetector 10 which receives the non-absorbed portion of the light coupled into light waveguide piece 9 and converts it to an electrical signal corresponding to the intensity of the received light, as well as a laser control circuit 11 which, on the basis of the electrical output signal of photodetector 10, controls semiconductor laser 1 in such a way that the light absorption in light waveguide piece 9 is at a maximum. These means together form a control device.

Semiconductor laser 1, the actuation circuit (laser driver circuit) required for its operation, and the above-mentioned means for regulating its emission wavelength provided according to the invention are together called the optical transmitter of the transmission system as indicated by the dashed box around them and a reference numeral 20 in FIG. 1.

Details of the control device will now be described: the means for coupling part of the light emitted by laser 1 into light waveguide piece 9 are provided, in the example of FIG. 1, in the form of a fiber-optic coupler 12 which is inserted into the light waveguide 2 leading from the optical output of the laser 1 in the direction toward the optical receiver of the transmission system. In its stead, any other means may be employed which is suitable to couple part of the light emitted by laser 1 into light waveguide piece 9. For example, the light exiting at the rear end of the semiconductor laser may also be coupled into a light waveguide piece and from there into light waveguide piece 9.

Light waveguide piece 9 has the significant characteristic that it has its maximum light absorption at the same wavelength at which the light waveguide piece 5 of the fiber-optic amplifier has its maximum gain, that is, spontaneous emission. As is known, this is the case, of course, if the light waveguide piece 9 is of the same type as the light waveguide piece 5. It is known, however, that it can also apply if the waveguide piece 9 differs from light waveguide piece 5 by a different core doping, aside from dopant $Er^{3+}$. It is possible, for example, to employ as light waveguide piece 5 a light waveguide piece whose core is doped not only with germanium but also with aluminum if this composition has advantages for use as amplifying light waveguide piece in a fiber-optic amplifier. Nevertheless it is favorable to employ a light waveguide piece 9 whose core is not doped with aluminum. Such a light waveguide also has its absorption maximum at the same wavelength (1536 nm) but much more distinctly, so that it is more suitable as a reference light waveguide piece for regulating the emission wavelength of the laser to the wavelength of the maximum absorption.

Thus, the only significant thing for the selection of light waveguide piece 9 is that, due to its wavelength dependent absorption, it is suitable as a good reference light waveguide in relation to the amplifying light waveguide of fiber-optic amplifier 3. The principle of the invention is that the control of the emission wavelength is made with reference to the wavelength dependence of the light absorption in a reference light waveguide piece 9 whose maximum lies at the same wavelength at which the amplifying fiber piece 5 has its maximum gain. In other words: In this way, the emission wavelength of laser 1 is regulated to the wavelength of the maximum gain of the amplifier light waveguide piece 5, in that it is regulated to the wavelength of the absorption maximum of a reference light waveguide 9.

As shown in FIG. 1, the reference light waveguide piece 9 may be disposed directly between the output of fiber-optic coupler 12 and the optical input of photodetector 10. Or it may also be spliced into a light waveguide (not shown) that extends therebetween.

Similar to the light waveguide pieces 5 in the fiber-optic amplifiers, it is shown in thicker lines in the drawing than the normal light waveguides, so as to distinguish it over them.

Of course, they are not thicker in reality, just differently doped in their cores.

Preferred embodiments of the light waveguide pieces are those that are doped with $Er^{3+}$ as the laser active substance. Instead, light waveguide pieces may also be employed which are doped with a different laser-active substance, presuming that this substance, as a host material, forms a three-energy-level system.

Laser control circuit 11 receives from photodetector 10 an electrical signal which corresponds to the non-absorbed component of the light emitted by the laser 1. By using known control technology, laser control circuit 11 controls the laser 1 in such a way that the light absorption in reference light waveguide 9 becomes a maximum.

To control the emission wavelength of semiconductor laser 1, advantage is taken of the fact that the emission wavelength is a function of the temperature of the laser. The temperature, in turn, is thermoelectrically controllable, as is customary with semiconductor lasers, in that a thermoelectric cooling device 13, a so-called Peltlet cooler 13 is provided in laser 1. An electrical cooler current here determines the present temperature of semiconductor laser 1. This cooler current is now controlled according to the invention by laser control circuit 11 in such a way that the emission wavelength is regulated in the described manner to the desired wavelength.

Controllable thermoelectric coolers for semiconductor lasers or semiconductor components are known per se, for example, from U.S. Pat. No. 4,307,469 or from DE-C 3,214,614, and therefore do not require discussion in greater detail.

Instead of by way of the cooler current of the laser cooler 13, the emission wavelength of the laser 1 can also be regulated by controlling the mean operating current of the laser 1. A combination of a regulation by way of the temperature and a regulation by way of the mean operating current is also possible.

Figure 2:
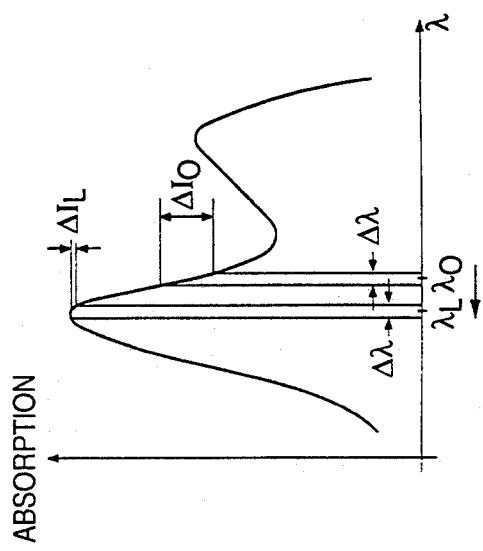
FIG. 2 is a schematic illustration of the wavelength dependent course of the absorption in an $Er^{3+}$ doped light waveguide piece to explain the way the wavelength is regulated to the maximum of the absorption.

It will now be described with reference to FIG. 2 how the laser control circuit preferably operates. The drawing figure is a schematic representation of the strong wavelength dependence of the absorption as it is typical for an $Er^{3+}$ doped light waveguide piece in a wavelength range of 1500 nm. For the reasons discussed above, the emission wavelength should ideally lie at the point where the absorption curve has its maximum, that is at $\lambda_L$. FIG. 2 considers the case that the emission wavelength differs and lies at $\lambda_O$, where the absorption is very highly wavelength dependent so that there is a need for regulation.

Laser control circuit 11 includes a modulator which, by means of its output control signal that controls the emission wavelength of laser I by way of the temperature, very slowly modulates the emission wavelength with a fluctuation of $\Delta\lambda$, for example at a modulation frequency of only 1 Hz. Such a modulation of the emission wavelength around $\lambda_O$ causes the electrical output signal of the photo detector to include a signal component at this modulation frequency. Its magnitude corresponds to the fluctuation $\Delta I_O$ in the intensity of the light received in photodetector 10 as a result of the modulation of the wavelength with the fluctuation $\Delta\lambda$. Thus, the signal component is greater the more the current wavelength $\lambda_O$ around which the modulation takes place lies in a region where the absorption curve is very steep. Thus it is possible to derive from the mentioned signal component a control signal for shifting $\lambda_O$. This is done by phase-sensitive rectification of the signal component with respect to the phase of the modulation. This also determines which sign the control signal to be put out by laser control circuit 11 must have, that is, in which direction $\lambda_O$ must be shifted.

If the current wavelength $\lambda_O$ lies in a region as shown in the example of FIG. 2, the absorption decreases, that is, the intensity of the received light increases if the wavelength is just being raised during the modulation. If, thus, this phase relationship is determined, $\lambda_O$ must be reduced so that it approaches the optimum wavelength $\lambda_L$. If $\lambda_O$ were to lie below $\lambda_L$, these phase relationships would be reversed so that then $\lambda_O$ would have to be increased.

Such a regulation of $\lambda_O$ in the direction toward $\lambda_L$ on the basis of the component at the modulation frequency in the output signal of the photodetector is performed until this component has disappeared. That is the case whenever $\lambda_O$ lies so close to $\lambda_L$ that the emission wavelength as a result of the modulation goes above and below the optimum wavelength $\lambda_O$. Instead of the signal component at the modulation frequency, a signal component at twice the modulation frequency then appears in the output signal of the photodetector because then the absorption passes through its maximum twice within one modulation period of the wavelength. As shown in the example of FIG. 2, the fluctuation $\Delta\lambda_L$ is then reduced to a minimum.

Since, as explained above, the amplification curve of fiber-optic amplifier 3 has its maximum at the same wavelength $\lambda_L$ and has a similar appearance as the absorption curve, the regulation of the emission wavelength to $\lambda_L$ accomplishes two things: optimum amplification of the light signals to be transmitted, with minimum dependence of the gain on wavelength fluctuations.

It will be understood that the above description of the present invention is susceptible to various modifications, changes and adaptations, and the same are intended to be comprehended within the meaning and range of equivalents of the appended claims.

What is claimed is:

1. An optical communications system comprising:
an optical transmitter including a semiconductor laser for generating a light signal;
a light waveguide path for transmitting the generated light signal; and
an optical receiver for receiving the transmitted light signal from the light waveguide path and having at least one fiber-optic amplifier including an amplifying light waveguide piece,
wherein the optical transmitter includes a control device having a reference waveguide piece, which regulates an emission wavelength of the semiconductor laser in dependence on absorption of the light signal in the reference light waveguide piece, the reference waveguide piece having a maximum in absorption at a wavelength at which the amplifying light waveguide piece of the at least one fiber-optic amplifier has a maximum in emission.

2. A system according to claim 1, further comprising:
coupling means for coupling part of the light signal generated by the semiconductor laser into the reference light waveguide piece; and wherein
the control device includes:
a photodetector which converts a light signal exiting the reference light waveguide piece into an electrical signal proportional to the intensity thereof; and
a control circuit which regulates an emission wavelength of the semiconductor laser based on the electrical signal so that the light signal coupled into the reference light waveguide piece is maximally absorbed therein.

3. A system according to claim 2, wherein the optical transmitter control circuit includes control means for controlling the temperature of the semiconductor laser, wherein the control device regulates an emission wavelength of the laser by controlling the temperature of the laser with the control means.

4. A system according to claim 3, wherein the control device regulates the emission wavelength by controlling the mean operating current of the laser.

5. A system according to claim 3, wherein the control circuit modulates the emission wavelength of the laser with a very low frequency and derives a control signal from a variation of an output signal of the photodetector occurring in response that shifts the emission wavelength so that absorption of the light signal in the reference light waveguide piece attains a maximum.

6. An optical transmitter comprising:
a semiconductor laser for generating a light signal for an optical communications system, the optical communications system including a light waveguide path for transmitting the generated light signal to an optical receiver, at least one fiber-optic amplifier including an amplifying light waveguide piece being inserted into said light waveguide path; and
a control device having a reference light waveguide piece, which regulates an emission wavelength of the semiconductor laser as a function of absorption of the light signal in the reference light waveguide piece having a maximum in absorption at a wavelength at which the amplifying light waveguide piece of the at least one fiber-optic amplifier has a maximum in emission.

7. An optical transmitter according to claim 6, further comprising:
coupling means for coupling part of the light signal generated by the semiconductor laser into the reference light waveguide piece; and wherein
the control device includes:
a photodetector which converts a light signal exiting the reference light waveguide piece into an electrical signal proportional to its intensity; and
a control circuit which regulates an emission wavelength of the semiconductor laser based on the electrical signal so that the light signal coupled into the reference light waveguide piece is maximally absorbed therein.

8. An optical transmitter according to claim 7, further comprising control means for controlling the temperature of the semiconductor laser wherein the control device regulates the emission wavelength of the semiconductor laser by controlling the temperature of the laser with the control means.

9. An optical transmitter according to claim 7, wherein the control device regulates the emission wavelength by controlling a mean operating current of the laser.

10. An optical transmitter according to claim 8, wherein the control device modulates the emission wavelength of the semiconductor laser with a very low frequency and derives a control signal from a variation of an output signal of the photodetector occurring in response that shifts the emission wavelength so that absorption of the light signal in the reference light waveguide piece attains a maximum.

* * * * *